(12) United States Patent
Morris et al.

(10) Patent No.: US 7,657,745 B2
(45) Date of Patent: *Feb. 2, 2010

(54) SECURE ELECTRONIC TRANSFER WITHOUT REQUIRING KNOWLEDGE OF SECRET DATA

(75) Inventors: Max G. Morris, Seattle, WA (US); Christopher G. Kaler, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 877 days.

This patent is subject to a terminal disclaimer.

(21) Appl. No.: 10/988,875

(22) Filed: Nov. 15, 2004

(65) Prior Publication Data

US 2005/0182935 A1     Aug. 18, 2005

Related U.S. Application Data

(63) Continuation-in-part of application No. 10/917,786, filed on Aug. 13, 2004, now Pat. No. 7,519,815.

(60) Provisional application No. 60/515,461, filed on Oct. 29, 2003.

(51) Int. Cl.
  *H04L 9/32* (2006.01)
  *H04L 9/08* (2006.01)
  *G06F 7/04* (2006.01)
  *G06Q 20/00* (2006.01)

(52) U.S. Cl. .......................... 713/168; 380/278; 726/4; 705/64

(58) Field of Classification Search .................. 713/168; 726/4; 705/64; 380/278
  See application file for complete search history.

(56) References Cited

U.S. PATENT DOCUMENTS

| 5,930,804 | A  | * | 7/1999 | Yu et al. ................... 707/104.1 |
| 6,263,446 | B1 |   | 7/2001 | Kausik |
| 6,772,336 | B1 |   | 8/2004 | Dixon, Jr. ................... 713/165 |
| 6,851,051 | B1 | * | 2/2005 | Bolle et al. ................. 713/168 |

(Continued)

FOREIGN PATENT DOCUMENTS

WO      WO 01/84771      11/2001

(Continued)

OTHER PUBLICATIONS

Office Action dated Apr. 29, 2008 cited in related case U.S. Appl. No. 10/917,786.

(Continued)

*Primary Examiner*—Michael Pyzocha
(74) *Attorney, Agent, or Firm*—Workman Nydegger

(57) ABSTRACT

A secure electronic transfer mechanism that does not require that the computing entities that are parties to the transaction be aware of the secret data used to secure the transfer. A transferring computing entity provides a request from a billing agent computing entity to transfer the electronically transferable item to a computing entity. The billing agent computing entity responds to the request by providing approval data to the second computing entity, the approval data being encrypted using secret data known to the billing agent computing entity and a supplemental computing entity associated with the transferee computing entity, but not to the transferring and transferee computing entity. The approval is provided to the supplemental computing entity, which then credits the transferee account.

28 Claims, 4 Drawing Sheets

U.S. PATENT DOCUMENTS

| | | |
|---|---|---|
| 6,879,690 B2 | 4/2005 | Faccin |
| 6,983,377 B1 | 1/2006 | Beesley |
| 7,191,151 B1* | 3/2007 | Nosek .................... 705/39 |
| 7,209,889 B1* | 4/2007 | Whitfield .................... 705/14 |
| 7,221,935 B2 | 5/2007 | Barriga-Caceres |
| 2002/0064149 A1 | 5/2002 | Elliott |
| 2002/0184103 A1* | 12/2002 | Shah et al. .................... 705/26 |
| 2003/0110046 A1* | 6/2003 | Cofta .................... 705/1 |
| 2003/0115487 A1* | 6/2003 | Andrews et al. ............ 713/201 |
| 2003/0157925 A1* | 8/2003 | Sorber et al. ................ 455/406 |
| 2004/0104807 A1* | 6/2004 | Ko ............................ 340/5.83 |
| 2004/0179690 A1 | 9/2004 | Soliman .................... 380/277 |
| 2004/0205344 A1 | 10/2004 | Otway et al. ................ 713/169 |
| 2004/0254867 A1* | 12/2004 | Nethery, III .................. 705/35 |
| 2005/0165784 A1 | 7/2005 | Gomez |
| 2006/0069926 A1 | 3/2006 | Ginter |

FOREIGN PATENT DOCUMENTS

| | | |
|---|---|---|
| WO | WO 03/042830 | 5/2003 |
| WO | WO 2004/077208 | 9/2004 |

OTHER PUBLICATIONS

Menezes, Alfred et al. Handbook of Applied Cryptology, CRC Press 1997, pp. 570-572.

Office Action dated Nov. 26, 2008 cited in U.S. Appl. No. 11/192,609.

* cited by examiner

SECURE ELECTRONIC TRANSFER WITHOUT REQUIRING KNOWLEDGE OF SECRET DATA

CROSS-REFERENCE TO RELATED APPLICATIONS

The present application is a continuation-in-part of U.S. patent Ser. No. 10/917,786, filed Aug. 13, 2004 No. 7,519,815 issued Apr. 14, 2009 (hereinafter also referred to as the "parent application"), which claims priority to U.S. provisional patent application Ser. No. 60/515,461 filed Oct. 29, 2003 (hereinafter also referred to as the "provisional application"). The parent application and the provisional application are incorporated herein by reference in their entirety.

BACKGROUND OF THE INVENTION

1. The Field of the Invention

The present invention relates generally to the electronic transfer of electronically transferable items. More specifically, the present invention relates to the secure transfer of electronically transferable items without requiring knowledge of secret data between the transferring computing entity and the transferee computing entity.

2. Background and Relevant Art

Computing technology has transformed the way we work and play. Computing systems and devices (hereinafter also referred to simply as "computing entities") now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions. In other computing entities, logic is implemented using hardware, or a combination or software and hardware.

Networking technologies enable computing entities to communicate even over vast distances, thereby expanding on computer functionality. For example, networking technologies enable such applications as e-mail, web browsing, file transfer, instant messaging, electronic whiteboarding, network collaboration, and the like. Accordingly, computer networks enable widespread communication and information access.

Unfortunately, computer networks also can potentially open up connected computing entities to security breaches. One type of security breach is for one computing system or user to make false claims about who they are to thereby access resources they should not have access to. In order to guard against this, an authenticate computing entity (i.e., a computing entity that requires authentication) will often require an authenticator computing entity (i.e., a computing entity that must authenticate) to authenticate itself. The authenticate computing entity may then make a more informed decision regarding how to interact with the authenticator computing entity.

One particularly useful form of authentication is often referred to as challenge/response authentication. In this form of authentication, when an authenticator computing entity (hereinafter also referred to as the "authenticator") is to authenticate to an authenticate computing entity (hereinafter also referred to as the "authenticatee"), the authenticate sends a challenge to the authenticator. The authenticate then generates a response (also referred to herein as an "answer") to the challenge typically by applying a one-way hash algorithm to the challenge using secret data available to the authenticatee and authenticator. This secret data may be, for example, a password corresponding to the authenticator. The authenticator likewise also generates the same answer using the same hashing algorithm and using the same secret data. The authenticator then provides its answer to the authenticatee. The authenticatee then compares the answer that the authenticator generated with the answer that the authenticatee generated. If the answers match, then the authentication is successful. The challenge/response authentication is advantageous in that the secret data itself is not transmitted, and thus may not be intercepted.

However, this challenge/response authentication requires that the authenticator and authenticatee computing entities have access to the secret data used for authentication, and that the authenticator and authenticatee computing entities generate the answer. In some environments this may not be desirable. For example, many computing entities have limited processing power. The generation of an answer may degrade the performance of the computing entity by diverting processing power from other processes. Furthermore, the computing entities may not be themselves secure. Accordingly, an unauthorized entity might conceivably access the secret data and use that data to falsely authenticate.

Accordingly, what would be advantageous is a challenge/response authentication mechanism that does not require the authenticator and authenticatee computing entities to generate an answer or contain the secret data itself. It would further be advantageous if the items could be securely transferred electronically even without requiring knowledge of secret data between the transferring and receiving computing entities.

BRIEF SUMMARY OF THE INVENTION

The foregoing problems with the prior state of the art are overcome by the principles of the present invention, which may be implemented within a network environment to allow a first computing entity to securely receive an electronic transfer from a second computing entity without requiring knowledge of secret data used to secure the transfer. The electronic transfer is accomplished via the use of a third and fourth computing entity, which may have knowledge of the secret data. The first and third computing entities are in a first sphere of trust; the second and fourth computing entities are in a second sphere of trust; and the third and fourth computing entities are in a third sphere of trust.

In accordance with a first embodiment of the present invention, the first computing entity provides an inquiry to the third computing entity as to whether or not the second computing entity has authorization to transfer the electronically transferable item. The third computing entity determines that the second computing entity has the authorization, and in response, credits the electronically transferable item to the first computing entity or its user. To do this, the third computing entity may inquire of the fourth computing entity as to whether there is authorization to make the transfer. The fourth computing entity may determine whether or not there is authorization based on prior communications with the second computing entity, and may inquire of the second computing entity as to whether the electronic transfer is to occur.

In accordance with a second embodiment of the present invention, the second computing entity provides a request to the fourth computing entity that a transfer of the electronically transferable item be made to the first computing entity. The fourth computing entity responds to the request by providing approval data to the second computing entity, the approval data being encrypted using secret data known to the third and fourth computing entities, but not to the first and second computing entities. The second computing entity then provides the encrypted approval data to the first computing entity, which then provides the encrypted approval data to the third computing entity. The third computing entity then decrypts the encrypted approval data, and responds to the approval data by crediting an account of the first computing entity or its user.

In either embodiment, secure electronic transfer is accomplished without the first and second computing entities needed to process or have knowledge of any secret data that may be used to secure the electronic transfer. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention provide a secure electronic transfer mechanism challenge based authentication mechanism that does not require that the two computing entities that are party to the transaction be aware of the secret data that may be used to secure the electronic transfer.

Figure 1:
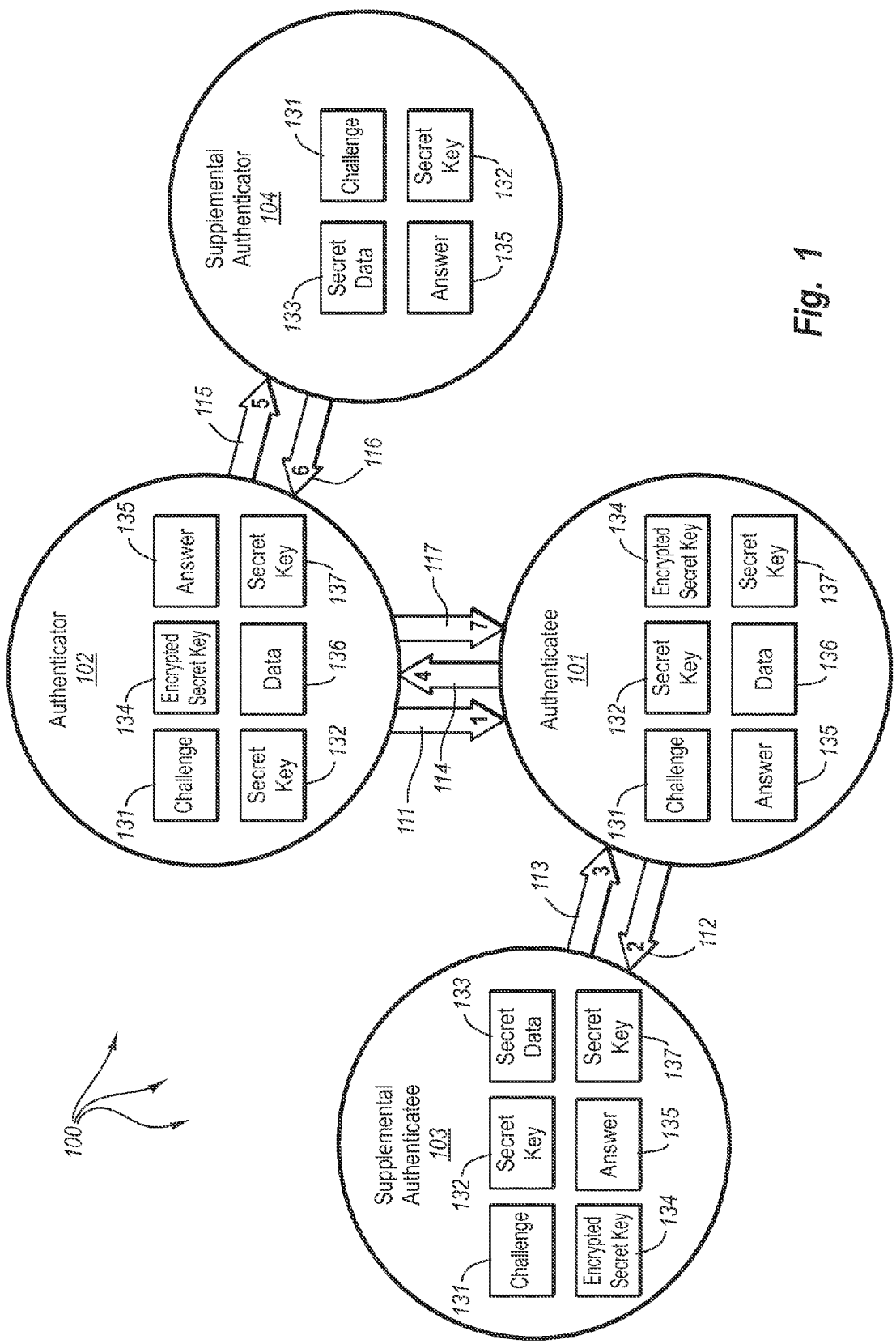
FIG. 1 is a diagram of a message exchange between an authenticatee, supplemental authenticatee, authenticator, and supplemental authenticator computing entities in accordance with the principles of the present invention.

FIG. 1 illustrates an environment 100 that includes four computing entities 101 through 104. Specifically, the four computing entities include what will be referred to as an authenticatee computing entity 101, an authenticator computing entity 102, a supplemental authenticatee computing entity 103, and a supplemental authenticator computing entity 104. In this description and in the claims, a "computing entity" is any device or system that may retain data in memory and/or storage, and is capable of electronic communication.

For example, each of the computing entities 101 through 104 may have access to its own internal data, and may communicate with one or more of the other computing entities. Such communication need not be across a network. For example, any two or more of the computing entities 101 through 104 may be within the same electronic device or computing system. As an example, the supplemental authenticator computing entity 104 may be a SIM card, while the authenticator computing entity 102 is a mobile telephone. The authenticatee computing entity 101 may be a front end Web server, while the supplemental authenticatee computing entity 103 may be a back end Web server. The principles of the present invention are not limited to this, however.

The authenticator computing entity 102 is to authenticate to the authenticatee computing entity 101. In the embodiment of FIG. 1, the authenticatee computing entity 101 and the supplemental authenticatee computing entity 103 are in a first common sphere of trust. The authenticator computing entity 102 and the supplemental authenticator computing entity 104 are also in a second common sphere of trust. The supplemental authenticatee computing entity 103 and the supplemental authenticator computing entity 104 are in a third common sphere of trust. A "sphere of trust" as used in this description and in the claims is defined as a collection of two or more computing entities in which each computing entity in the sphere of trust has received some assurance that the other computing entities are who they purport to be, and that information from the other computing entities is at least somewhat reliable.

In this description and in the claims, the authenticatee computing entity 101, the authenticator computing entity 102, the supplemental authenticatee computing entity 103, and the supplemental authenticator computing entity 104, may also be referred to as simply the "authenticatee 101", the "authenticator 102", the "supplemental authenticatee 103", and the "supplemental authenticator 104", respectively.

FIG. 1 also shows an example message flow that results in authentication consistent with the principles of the present invention. The sequential order of a message transfer is represented sequentially by the number in the head of the arrow that represents the message transfer. Using this message flow, an authentication method in accordance with the principles of the present invention will now be described. The method allows the authenticator 102 to authenticate to the authenticatee 101 using challenge based authentication and without requiring the authenticator 102 and authenticatee 101 computing entities be aware of secret data used for the authentication.

The authenticatee 101 determines that the authenticator 102 is to authenticate. This may be accomplished by, for example, the authenticatee 101 receiving a service request (see arrow 111) from the authenticator 102. However, the authenticatee 101 may make the determination that the authenticator 102 is to be authenticated in some other manner that does not rely on any service request from the authenticator 102. Accordingly, the service request represented by arrow 111 is not essential.

The authenticatee 101 then acquires a challenge 131 from the supplemental authenticatee 103. This may be accomplished in any manner. However, in FIG. 1, this is illustrated as being accomplished with two message transfers represented by arrows 112 and 113. Specifically, the authenticatee 101 provides a challenge request represented by arrow 112 to the supplemental authenticatee 103. The supplemental authenticatee 103 may then generate a challenge 131 in response to the challenge request, and then provides the challenge 131 to the authenticatee 101 in response to the request as represented by arrow 113. However, there are a number of alternative ways that the authenticatee 101 may acquire the challenge 131. The challenge 131 may have been provided by the supplemental authenticatee 103 without a challenge request such as, for example, when the authenticatee 101 registers with the supplemental authenticatee 103, or perhaps at predetermined times or time intervals.

In one embodiment called herein the "subsequent private communications embodiment", additional acts may be undertaken such that the authenticatee 101 and authenticator 102 may subsequently communicate without relying on the supplemental authenticatee 103 and supplemental authenticator 104. For example, in the subsequent private communications embodiment, the authenticatee 101 may generate secret key data 132 that is likely not known to the authenticator 102, the supplemental authenticatee 103, or the supplemental authenticator 104.

The authenticatee 101 provides the secret key data 132 to the supplemental authenticatee 103 thereby informing the supplemental authenticatee 103 of the secret key data 132. The secret key data 132 may, for example, have been provided in the same message as the challenge request represented by arrow 112.

The supplemental authenticatee 103 then may encrypt the secret key data 132 using secret data 133 known to the supplemental authenticatee 103 and the supplemental authenticator 104 computing entities, but not known to the authenticatee 101 and the authenticator 102. The supplemental authenticatee 103 then may provide the encrypted secret key data 134 to the authenticatee 101. This encrypted secret key data 134 may be provided at the same time and/or in the same message that the supplemental authenticatee 103 used to transfer the challenge 131 as represented by arrow 113.

The authenticatee 101 then provides the challenge 131 to the authenticator 102 as represented by arrow 114. At the same time and/or in the same message, the authenticatee 101 may also provide the encrypted secret key data 134 to the authenticator 102 as represented by arrow 114.

The authenticator 102 then acquires an answer to the challenge 131 from the supplemental authenticator 104 computing entity. This may be accomplished in any manner. However, in FIG. 1, this is illustrated as being accomplished with two message transfers represented by arrows 115 and 116. Specifically, the authenticator 102 provides the challenge 131 to the supplemental authenticator 104 as represented by arrow 115. The supplemental authenticator 104 may then determine an answer 135 to the challenge 131, and then provides the answer 135 to the authenticator 102 as represented by arrow 116. The answer may be generated by, for example, performing a one-way hash algorithm on the challenge 131 using the secret data 133.

In the subsequent private communications embodiment, the authenticator 102 may also provide the encrypted secret key data 134 to the supplemental authenticator 104. This may be accomplished by including the encrypted secret key data 134 in the same message as was used to transmit the challenge to the supplemental authenticator 104 as represented by arrow 115.

The supplemental authenticator 104 may then decrypt the secret key data 134 using the secret data 133 known to the supplemental authenticatee 103 and the supplemental authenticator 104, thereby informing the supplemental authenticator 104 of the secret key data 132. The supplemental authenticator 104 then provides the secret key data 132 to the authenticator 102 thereby informing the authenticator 102 the secret key data 132. The supplemental authenticator 104 may provide the secret key data 132 back to the authenticator 102 potentially in the same message that was used to transfer the answer 135 to the authenticator 102. At this stage, both the authenticatee 101 and authenticator 102 have access to secret key data 132. This secret key data 132 may thus be used to authenticate each other in subsequent communications independent of the supplemental authenticatee 103 and supplemental authenticator 104.

The authenticator 102 provides the answer 135 to the authenticatee 101 as represented by the arrow 117. The authenticatee 101 may then use the answer 135 to authenticate the authenticator 102. There are a number of different ways that the authenticatee 101 may do this.

In one example, the authenticatee 101 may acquire an answer to the challenge from the supplemental authenticatee 103, potentially at the same time and in the same manner as the challenge was acquired from the supplemental authenticatee 103. The authenticatee 101 may then match the answer as acquired from the supplemental authenticatee 103 with the answer as provided by the authenticator 102. A match results in the authenticator 102 authenticating to the authenticatee 101.

Alternatively, the authenticatee 101 could delegate this comparison to the supplemental authenticatee 103 by providing the answer 135 as provided by the authenticator 102 to the supplemental authenticatee 103. The supplemental authenticatee 103 may then match the answer as provided by the authenticatee 101 with the answer that it internally generated. If a match is found, the supplemental authenticatee 103 may indicate to the authenticatee 101 that authentication is successful.

Accordingly, at this stage, the authenticator 102 has authenticated to the authenticatee 101, and the service request may be honored if appropriate. The authentication is challenge-based, and does not require the authenticatee 101 or authenticator 102 have access to the secret data 133 used to generate an answer to the challenge. Furthermore, in the subsequent private communications embodiment, the authenticator 102 and authenticatee 101 may authenticate in subsequent communications using the secret key data 132, rather than repeating the process described above.

Rather than simply securing subsequent communication based on the secret key data 132 alone, the subsequent communications may be secured using a digest of the secret key data 132 amongst one or more other items. The digest may then be used to secure subsequent communications between the authenticatee 101 and authenticator 102. The digest may also be based on the challenge 131 and/or the answer 135. Furthermore, the digest may include data 136 communicated between the authenticator 102 and authenticatee 101 that is not also communicated to the supplemental authenticatee 103 or supplemental authenticator 104. The authenticatee 101 and authenticator 102 may then communicate using the digest to secure communications. When the digest is based in part on the data 136 that is not known to the supplemental authenticatee 103 and the supplemental authenticator 104, the supplemental authenticatee 103 and supplemental authenticator 104 are prevented from easily eavesdropping or spoofing on subsequent communications between the authenticator 102 and authenticatee 101.

In one embodiment, the authenticator 102 also generates secret key data 137, which is provided to the supplemental authenticator 104. The supplemental authenticator 104 encrypts the secret key data 137, and passes the encrypted secret key data to the authenticator 102. The authenticator 102 then passes the encrypted secret key data to the authenticatee 101, which uses the supplemental authenticatee 103 to decrypt the secret key 137 using the secret data 133. The digest may then also be based upon this secret key 137.

Accordingly, a challenge-based authentication mechanism has been described in which the direct parties to the authentication (i.e., the authenticator and authenticatee computing entities) need not calculate an answer to a challenge, nor have knowledge of secret data used in the initial authentication. Furthermore, the authenticator and authenticatee computing entity may subsequently authenticate and communicate independent of the supplemental authenticator and supplemental authenticatee computing entities.

In the embodiment illustrated in FIG. 1, there are several communication channels, one between the authenticatee 101 and the supplemental authenticatee 103 (hereinafter also potentially referred to as "the authenticatee channel"), one between the authenticator 102 and the supplemental authenticator 104 (hereinafter also potentially referred to as the "authenticator channel"), and one between the authenticatee 101 and the authenticator 102 (hereinafter also potentially referred to as the "authentication channel"). If the two computing entities are within the same device or computing system, the corresponding channel may be a function call or local message mechanism. However, if the two computing entities are remotely located, the corresponding channel may use a networking protocol.

For example, if the two computing entities are located across different transport-level domains, a transport-independent network protocol may be used to communicate. One such transport-independent network protocol is known in the art as "Web Services" which uses Simple Object Access Protocol (SOAP) envelopes to convey information in a transport-independent manner. Web Services may also employ SOAP tunneling to transport across networks that do not directly support SOAP.

Figure 2:
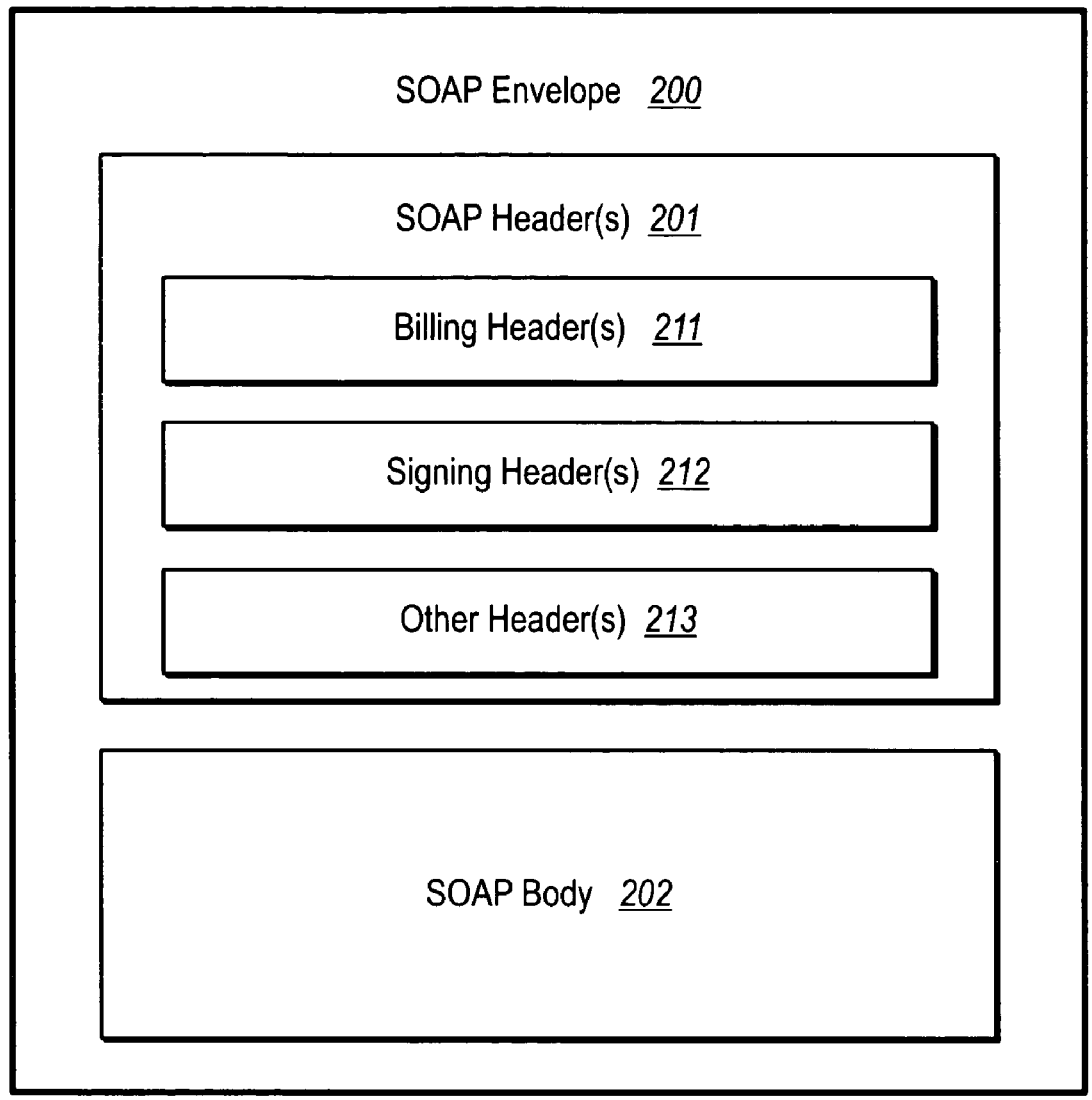
FIG. 2 schematically illustrates a data structure in the form of a Simple Object Access Protocol (SOAP) envelope that includes SOAP headers in the form of billing and signing headers.

According to one aspect of the invention, a modification to conventional Web Services may be employed to convey information important to authentication. For example, a SOAP header may include a signing SOAP header as described in the U.S. provisional application No. 60/515,461 incorporated by reference above. FIG. 2 schematically illustrates a structure of such a SOAP envelope suitable for performing billing and signing in the context of Web Services. The SOAP envelope 200 includes SOAP headers 201 and a SOAP body 202. The SOAP headers include billing header(s) 211, signing header(s) 212, amongst potentially other headers 213. The signing headers 212 may include the information for authentication. For example, the challenge 131, the secret key 132, the encrypted secret keys 134 and 137, the answer 135, and the data 136 as well as any other useful information may be included in the signing header(s) 212. However, the principles of the present invention are not limited to communication using Web Services. It may be that none of the authenticatee, authenticator, or authentication channels use Web Services in a particular embodiment.

Once authentication has been completed, the authenticatee 101 is now in a position to make a more intelligent decision regarding whether to authorize a service to be provided to the authenticator 102. Since the process has at this stage progressed beyond authentication to authorization, computing entities 101 through 104 will each in the subsequent description of the subsequent drawings be referred to simply as a "computing entity".

In order to authorize a requested service, the computing entity 101 may as a condition for such authorization require the payment or transfer of electronically transferable items from the computing entity 102. In this description and in the claims, an "electronically transferable item" is any item, whether physical or electronic, whose ownership may be transferred from one entity to another by sending an electronic message. The electronic message need not be purely electronic during the transfer, but may undertake other forms such as optical forms during the transfer. Such transferable items may include money. However, the transferable items may also include any other item that is electronically transferable. For example, the items may be frequent flier miles, movie or opera ticket credits, train tickets, class registration authority, and so forth. Likewise, in order to perform the requested service, the computing entity 101 may transfer electronically transferable items to the computing entity 102.

Figure 3:
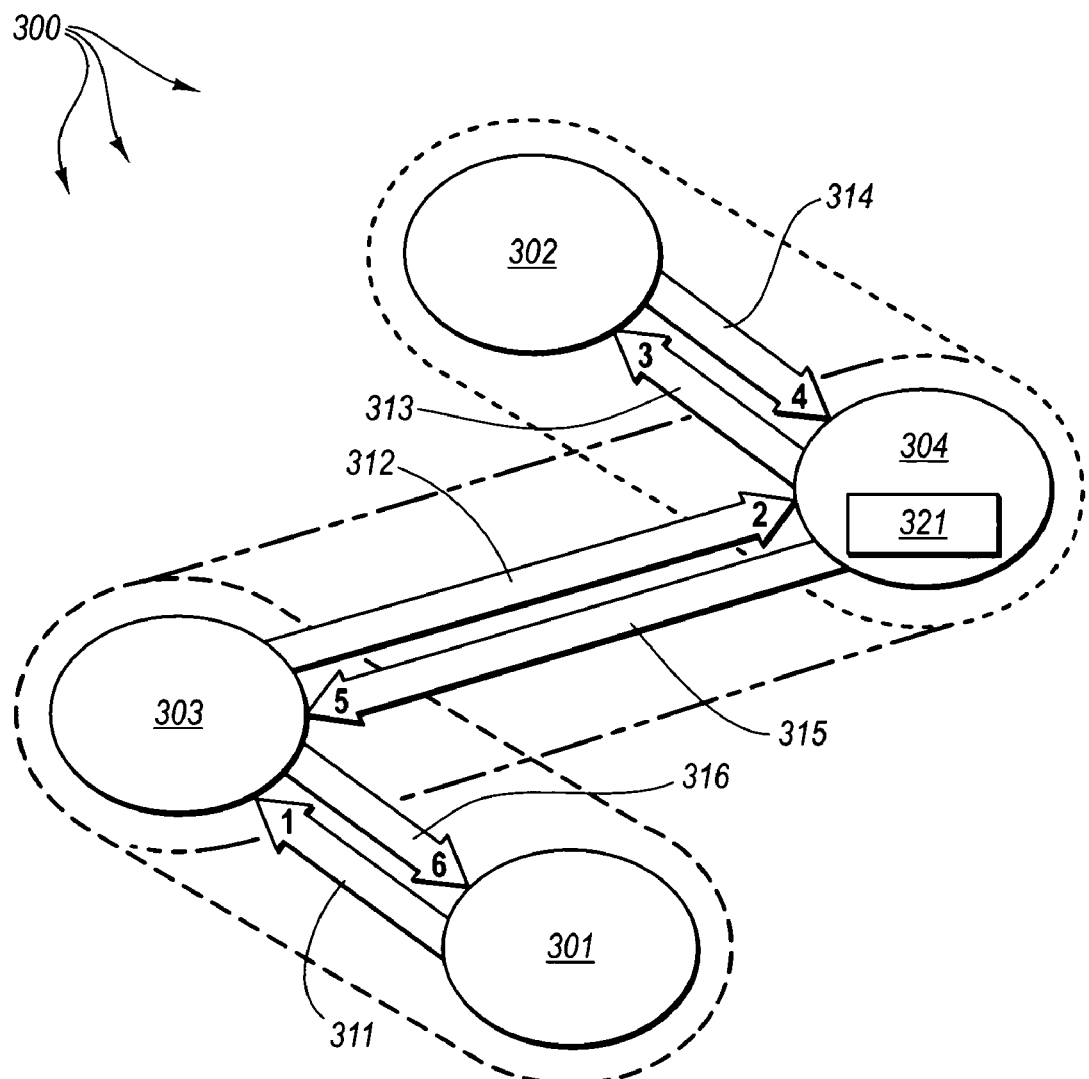
FIG. 3 illustrates a message exchange in which electronically transferable items are transferred between two computing entities in accordance with a first embodiment of the present invention.

FIG. 3 illustrates the environment of FIG. 1 in which there are four computing entities 301 through 304. The computing entities 301 through 304 may be the same as described above for computing entities 101 through 104, although this is not required. Computing entities 301 and 303 are in one sphere of trust represented by the area within the dashed lines. Computing entities 302 and 304 are in another sphere of trust represented by the area within the dotted lines. Computing entities 303 and 304 are within yet another sphere of trust as represented the area within the intermittent dotted/dashed lines.

FIG. 3 also shows a message flow showing a way of transferring electronically transferable items between computing entities 301 and 302. Computing entity 304 has authorization information 321 relevant to whether or not computing entity 302 may transfer particular items to computing entity 301. For example, if the computing entity 302 were a SIM card, the items to be transferred may be, for example, money.

The message flow shows how items could be authorized to be transferred and then actually transferred from computing entity 302 to computing entity 301. In order to authorize transfer, the computing entity 301 may inquire (see arrow 311) of computing entity 303 as to whether or not computing entity 302 has authorization to transfer the items. If the computing entity 303 does not already know, the computing entity 303 will make the inquiry (see arrow 312) to computing entity 304 as to whether or not computing entity 302 is authorized to make the transfer. If the computing entity 304 does not already know, the computing entity 304 will make inquiry (see arrow 313) to computing entity 302 about whether to make the transfer. The computing entity 302 may respond (see arrow 314) in the affirmative. Upon receiving this message, or if the computing entity 304 had been pre-authorized to make the charge due to prior communication with computing entity 302, then the computing entity 304 responds (see arrow 315) in the affirmative. Upon receiving this message, or if the computing entity 303 had been pre-authorized to make the charge due to prior communication with computing entity 304, then the computing entity 303 responds (see arrow 316) in the affirmative. The affirmative confirmations represented by arrows 314 through 316 may also include electronic transfer of the items itself, or an agreement to enforce transfer at a later time.

Figure 4:
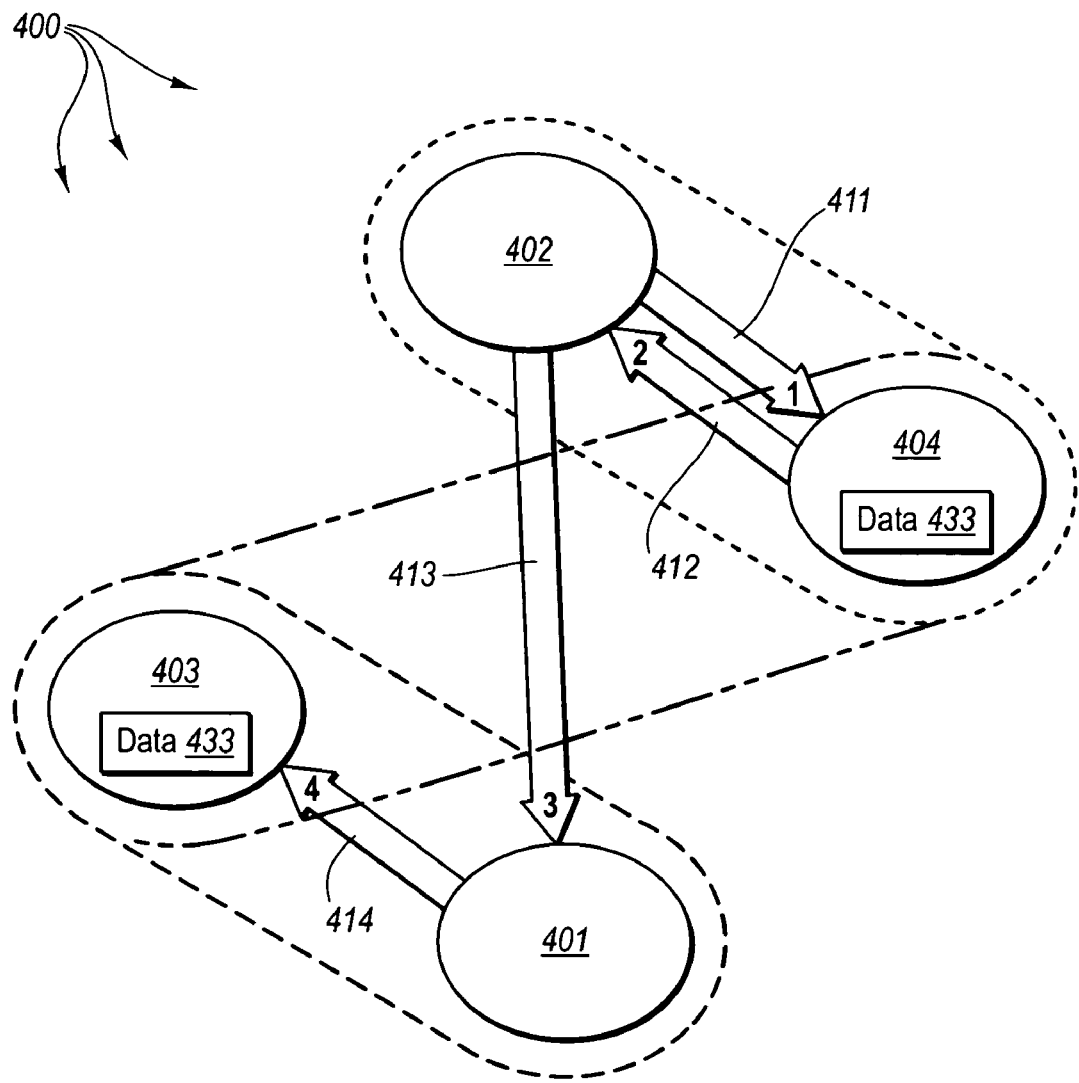
FIG. 4 illustrates a message exchange in which electronically transferable items are transferred between two computing entities in accordance with a second embodiment of the present invention.

An alternative embodiment of transfer is illustrated in FIG. 4. In this embodiment, computing entity 402 requests (see arrow 411) that the transfer of items be made. Computing entity 404 responds (see arrow 412) with an approval to transfer the items (see arrow 412) and then debits an account by the items to be transferred. The approval to transfer may be encrypted using secret data 433 known to the computing entities 403 and 404, but not to the computing entities 401 and 402. Computing entity 402 then provides the encrypted approval (see arrow 413) to computing entity 401, which then provides the encrypted approval (see arrow 414) to computing entity 403. The computing entity decrypts the approval using secret data 433 and then credits the account of computing entity 401 or the user of computing entity 401 in the amount of the items being transferred. Upon a subsequent reconciliation or in real-time, computing entity 403 may acquire a credit for the items transferred from computing entity 404.

Thus, transfer of the electronically transferable items is made from the computing entity 402 (or its user) to the computing entity 401 (or its user). Transfer in the other direction from computing entity 401 to computing entity 402 may be accomplished in the same manner as described above only in the symmetrically opposite direction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In an environment that includes a first, second, third and fourth computing entities, a method for the second computing entity to electronically transfer an electronically transferable item to the first computing entity with assistance from the third and fourth computing entities, wherein the first and third computing entities are in a first sphere of trust, the second and fourth computing entities are in a second sphere of trust, and the third and fourth computing entities are in a third sphere of trust, the method comprising the following:

an act of the first computing entity authenticating the second computing entity, authentication including:
      an act of the first computing entity generating secret key data that is not known to the second, third, and fourth computing entities;
      an act of the first computing system providing the secret key data to the third computing entity;
      an act of the third computing entity encrypting received secret key data with secret data known to the third and fourth computing entities but not know to the first and second computing entities, the secret data for protecting a proper answer to a challenge based on the secret key data and for protecting approval data related to authorization for transferring electronically transferable items;
      an act of the first computing entity sending a challenge along with the encrypted secret key data to the second computing entity;
      an act of first computing entity receiving a purported answer to the challenge from the second computing entity, the purported answer to the challenge created at the fourth computing entity, the fourth computing entity using the secret data to decrypt the secret key data;
      an act of the first computing entity providing the purported answer to the challenge to the third computing entity;
      an of the third computing entity determining that the purported answer is an appropriate answer to the challenge based on a comparison of the purported answer to a proper answer for the challenge;
   subsequent authenticating the second computing entity, an act of the first computing entity providing an inquiry to the fourth computing entity as to whether or not the second computing entity has authorization to transfer the electronically transferable item; and
   an act of the fourth computing entity determining that the second computing entity has the authorization; and
   in response to the act of determining that the second computing entity has the authorization, performing the following:
      an act of crediting the electronically transferable item to the first computing entity or its user.

2. A method in accordance with claim 1, wherein the fourth computing entity further performs the following in response to the act of determining that the second computing entity has the authorization:
   an act of responding to the inquiry from the first computing entity in the affirmative.

3. A method in accordance with claim 1, wherein the fourth computing entity further performs the following in response to the act of determining that the second computing entity has the authorization:
   an act of debiting the electronically transferable item from the second computing entity or its user.

4. A method in accordance with claim 1, wherein the act of the fourth computing entity determining that the second computing entity has the authorization comprises the following:
   an act of the fourth computing entity having previously received a request to authorize the electronic transfer of the electronically transferable item from the second computing entity.

5. A method in accordance with claim 1, wherein the electronically transferable item includes money.

6. A method in accordance with claim 1, wherein the electronically transferable item includes frequent flier miles.

7. A method in accordance with claim 1, wherein the electronically transferable item includes a movie ticket.

8. A method in accordance with claim 1, wherein the electronically transferable item includes opera ticket credits.

9. A method in accordance with claim 1, wherein the electronically transferable item includes train tickets.

10. A method in accordance with claim 1, wherein the electronically transferable item includes class registration authority.

11. A computer program product for use in an environment that includes a first, second, third and fourth computing entities, the computer program product for implementing a method for the second computing entity to electronically transfer an electronically transferable item to the first computing entity with authentication and authorization assistance from the third and fourth computing entities, wherein the first and third computing entities are in a first sphere of trust, the second and fourth computing entities are in a second sphere of trust, and the third and fourth computing entities are in a third sphere of trust, the computer program product comprising one or more computer storage media having computer-executable instructions that, when executed by one or more processors, causes the method to be performed, the method comprising the following:

an act of the first computing entity authenticating the second computing entity, authentication including:
      an act of the first computing entity generating secret key data that is not known to the second, third, and fourth computing entities;
      an act of the first computing system providing the secret key data to the third computing entity;
      an act of the third computing entity encrypting received secret key data with secret data known to the third and fourth computing entities but not know to the first and second computing entities, the secret data for protecting a proper answer to a challenge based on the secret key data and for protecting approval data related to authorization for transferring electronically transferable items;

an act of the first computing entity sending a challenge along with the encrypted secret key data to the second computing entity;

an act of first computing entity receiving a purported answer to the challenge from the second computing entity, the purported answer to the challenge created at the fourth computing entity, the fourth computing entity using the secret data to decrypt the secret key data;

an act of the first computing entity providing the purported answer to the challenge to the third computing entity;

an of the third computing entity determining that the purported answer is an appropriate answer to the challenge based on a comparison of the purported answer to a proper answer for the challenge;

subsequent to the first computing entity authenticating the second computing entity, an act of the first computing entity providing an inquiry to the fourth computing entity as to whether or not the second computing entity has authorization to transfer the electronically transferable item; and an act of the fourth computing entity determining that the second computing entity has the authorization; and in response to the act of determining that the second computing entity has the authorization, performing the following:

an act of crediting the electronically transferable item to the first computing entity or its user.

12. A computer program product in accordance with claim 11, wherein the fourth computing entity further performs the following in response to the act of determining that the second computing entity has the authorization:

an act of responding to the inquiry from the first computing entity in the affirmative.

13. A computer program product in accordance with claim 11, wherein the fourth computing entity further performs the following in response to the act of determining that the second computing entity has the authorization:

an act of debiting the electronically transferable item from the second computing entity or its user.

14. A computer program product in accordance with claim 11, wherein the electronically transferable item includes money.

15. A computer program product in accordance with claim 11, wherein the electronically transferable item includes frequent flier miles.

16. A computer program product in accordance with claim 11, wherein the electronically transferable item includes a movie ticket.

17. A computer program product in accordance with claim 11, wherein the electronically transferable item includes opera ticket credits.

18. A computer program product in accordance with claim 11, wherein the electronically transferable item includes train tickets.

19. A computer program product in accordance with claim 11, wherein the electronically transferable item includes class registration authority.

20. In an environment that includes a first, second, third and fourth computing entities, a method for the second computing entity to electronically transfer an electronically transferable item to the first computing entity with assistance from the third and fourth computing entities, wherein the first and third computing entities are in a first sphere of trust, the second and fourth computing entities are in a second sphere of trust, and the third and fourth computing entities are in a third sphere of trust, the method comprising:

an act of the first computing entity authenticating the second computing entity, authentication including:

an act of the third computing entity encrypting received secret key data with secret data known to the third and fourth computing entities but not know to the first and second computing entities, the secret data for protecting a proper answer to a challenge based on the secret key data and for protecting approval data related to authorization for transferring electronically transferable items;

an act of first computing entity receiving a purported answer to the challenge from the second computing entity, the purported answer to the challenge created at the forth computing entity, the fourth computing entity using the secret data to decrypt the secret key data; and an of the first computing entity determining that the purported answer is an appropriate answer to the challenge based on a comparison of the purported answer to the proper answer;

subsequent to the first computing entity authenticating the second computing entity, an act of the second computing entity providing a request to the fourth computing entity that a transfer of the electronically transferable item be made to the first computing entity;

an act of the fourth computing entity responding to the request by providing approval data to the second computing entity, the approval data being encrypted using the secret data;

an act of the second computing entity providing the encrypted approval data to the first computing entity;

an act of the first computing entity providing the encrypted approval data to the third computing entity;

an act of the third computing entity using the secret data to decrypt the encrypted approval data; and an act of the third computing entity responding to the decrypted approval data by crediting an account of the first computing entity or its user.

21. A method in accordance with claim 20, further comprising:

an act of the fourth computing entity responding to the request by debiting an account of the second computing entity or its user in the amount of the electronically transferable item.

22. A method in accordance with claim 20, further comprising:

an act of the third and fourth computing entities reconciling the credit and debit.

23. A method in accordance with claim 20, wherein the electronically transferable item includes money.

24. A method in accordance with claim 20, wherein the electronically transferable item includes frequent flier miles.

25. A method in accordance with claim 20, wherein the electronically transferable item includes a movie ticket.

26. A method in accordance with claim 20, wherein the electronically transferable item includes opera ticket credits.

27. A method in accordance with claim 20, wherein the electronically transferable item includes train tickets.

28. A method in accordance with claim 20, wherein the electronically transferable item includes class registration authority.

* * * * *